(12) United States Patent
Paquette (10) Patent No.: US 10,219,446 B2
(45) Date of Patent: Mar. 5, 2019

(54) PLANT GROWING APPARATUS

(71) Applicant: Carl Paquette, Sutton (CA)

(72) Inventor: Carl Paquette, Sutton (CA)

( * ) Notice: Subject to any disclaimer, the term of this patent is extended or adjusted under 35 U.S.C. 154(b) by 323 days.

(21) Appl. No.: 15/285,606

(22) Filed: Oct. 5, 2016

(65) Prior Publication Data
US 2017/0094914 A1    Apr. 6, 2017

Related U.S. Application Data

(60) Provisional application No. 62/237,175, filed on Oct. 5, 2015.

(51) Int. Cl.
| | | |
|---|---|---|
| *A01G 9/14* | (2006.01) |
| *A01G 7/04* | (2006.01) |
| *A01G 9/20* | (2006.01) |
| *A01G 9/24* | (2006.01) |
| *F21V 7/00* | (2006.01) |
| *F21V 11/18* | (2006.01) |
| *F21V 14/00* | (2018.01) |
| *F21V 23/00* | (2015.01) |
| *F21V 33/00* | (2006.01) |
| *A01G 9/16* | (2006.01) |
| *F21Y 115/10* | (2016.01) |

(52) U.S. Cl.
CPC .............. *A01G 9/14* (2013.01); *A01G 7/045* (2013.01); *A01G 9/16* (2013.01); *A01G 9/20* (2013.01); *A01G 9/246* (2013.01); *A01G 9/247* (2013.01); *F21V 7/00* (2013.01); *F21V 11/186* (2013.01); *F21V 14/006* (2013.01); *F21V 23/003* (2013.01); *F21V 33/006* (2013.01); *A01G 9/24* (2013.01); *F21Y 2115/10* (2016.08); *Y02A 40/254* (2018.01); *Y02A 40/264* (2018.01)

(58) Field of Classification Search
CPC .......... A01G 9/14; A01G 9/1469; A01G 9/20; A01G 9/16
See application file for complete search history.

(56) References Cited

U.S. PATENT DOCUMENTS

| 3,939,338 A | 2/1976 | Giammalvo |
| 4,543,744 A | 10/1985 | Royster |
| 5,430,972 A | 7/1995 | Wianecki |
| 5,813,169 A * | 9/1998 | Engerman ................ A01G 9/16 47/17 |
| 2014/0047765 A1* | 2/2014 | Wescott .................... A01G 9/16 47/17 |

(Continued)

FOREIGN PATENT DOCUMENTS

WO    WO-2016139375 A1 *  9/2016  ............... A01G 9/14

*Primary Examiner* — Monica L Williams
(74) *Attorney, Agent, or Firm* — Price Heneveld LLP (57) ABSTRACT

A plant growing apparatus including a chamber for growing plants. The chamber includes a base for receiving the plants, a lid movably mounted in relation to the base having an outer face and an opposite inner face, and a collapsible screen having an inner surface and being mounted between the base and the lid for closing the chamber. The collapsible screen is operable between an extended configuration and a collapsed configuration. The collapsible screen is configured to collapse upon approaching the lid towards the base and to extend, upon distancing the lid away from the base. The plant growing apparatus also includes a horticultural lamp mounted on the inner face of the lid.

16 Claims, 6 Drawing Sheets

(56) References Cited

U.S. PATENT DOCUMENTS

| | | | |
|---|---|---|---|
| 2016/0120135 A1* | 5/2016 | Herrick | A01G 9/16 47/17 |
| 2017/0071139 A1* | 3/2017 | Fence | A01G 9/227 |
| 2017/0202155 A1* | 7/2017 | Iwai | A01G 9/14 |

* cited by examiner

PLANT GROWING APPARATUS

TECHNICAL FIELD

The technical field generally relates to chambers for growing plants, and more particularly, relates to a plant growing apparatus for harvesting plants, herbs and the like.

BACKGROUND

Chambers for growing plants, or small greenhouses, are well known in the art. In general, chambers for growing plants are open to the environment and mainly rely on ambient light or natural sunlight to promote growth.

Some chambers include a horticultural lamps either suspended from the chamber or positioned near the chamber to direct the horticultural light onto the plants.

Some chambers for growing plants can have a closed box. The box generally has a fixed and rigid size and shape. Although the light source might be displaceable within the box, the sides of the box remain rigid.

However, these rigid designs are suitable to adjust to the size of the plants. In fact, some plants remain close to the soil during growth. Furthermore, most plants grow from a seed to their actual fully grown size in weeks or months.

Therefore, there is a need for a plant growing apparatus that overcomes at least some of the disadvantages of what is known in the art.

SUMMARY

One object of the present invention is to provide a solution to at least one of the above-mentioned prior art drawbacks.

According to the present invention, there is provided a plant growing apparatus, the plant growing apparatus comprising:
 a chamber having a vertical axis, the chamber comprising:
 a base for receiving plants;
 a lid movably mounted in relation to the base having an outer face and an opposite inner face, such that the inner face of the lid is facing the base;
 a collapsible screen having an inner surface and mounted between the base and the lid for closing the chamber, the screen being operable between an extended configuration and a collapsed configuration, said collapsible screen being configured to collapse upon approaching the lid towards the base and to extend, upon distancing the lid away from the base; and
 a horticultural lamp mounted on the inner face of the lid.

In some implementations, the base comprises a basin adapted to hold water therein.

In some implementations, the plant growing apparatus comprises a vertical adjustment mount operatively connected to the base and to the lid for adjusting a distance between the base and the lid, wherein the lid is slidable along the vertical adjustment mount.

In some implementations, the vertical adjustment mount comprises an actuator to move the lid in relation to the base.

In some implementations, the actuator is a rack and pinion mechanism extending between the base and the lid, the pinion being connected to the lid and engageable with the rack to move the lid in relation to the base.

In some implementations, the collapsible screen comprises at least four collapsible screens, each inner surface of a collapsible screen at least partially faces a corresponding inner surface of another collapsible screen.

In some implementations, the inner surface of the collapsible screen comprises a reflective material.

In some implementations, at least one of the at least four collapsible screens comprises a rollable screen.

In some implementations, at least one of the at least four collapsible screens comprises a telescoping panel.

In some implementations, the telescopic panel comprises two rigid partitions, a first rigid partition connected to the base and a second rigid partition connected to the lid, said first and second rigid partitions being configured to slide vertically past one another.

In some implementations, the horticultural lamp comprises a LED light source.

In some implementations, the plant growing apparatus further comprises at least one fan mounted inside the chamber.

In some implementations, the chamber comprises a closable air inlet for ventilating said chamber.

In some implementations, the plant growing apparatus further comprises a timer operatively connected to the horticultural lamp for activating said horticultural lamp during selected time periods.

In some implementations, the base comprises a closable aperture for supplying water to the basin.

In some implementations, the base further comprises a float inlet and a float stem extending upwardly through said float inlet to an upper end above the base, the float stem having a buoyancy whereby said float stem floats at the surface of water within the basin, the position of said upper end of said float stem continuously indicating the level of water in said basin.

In some implementations, the chamber is substantially opaque.

The components, advantages and other features of plant growing apparatus implementations will become more apparent upon reading of the following non-restrictive description of some optional configurations, given for the purpose of exemplification only, with reference to the accompanying drawings.

DETAILED DESCRIPTION OF PREFERRED EMBODIMENTS OF THE INVENTION

The present invention generally relates to a plant growing apparatus for harvesting plants, herbs and the like. The plant growing apparatus can be used indoor for an all year long harvesting and outdoor for a controlled growing environment. Advantageously, the plant growing apparatus has a compact design.

Figure 1:
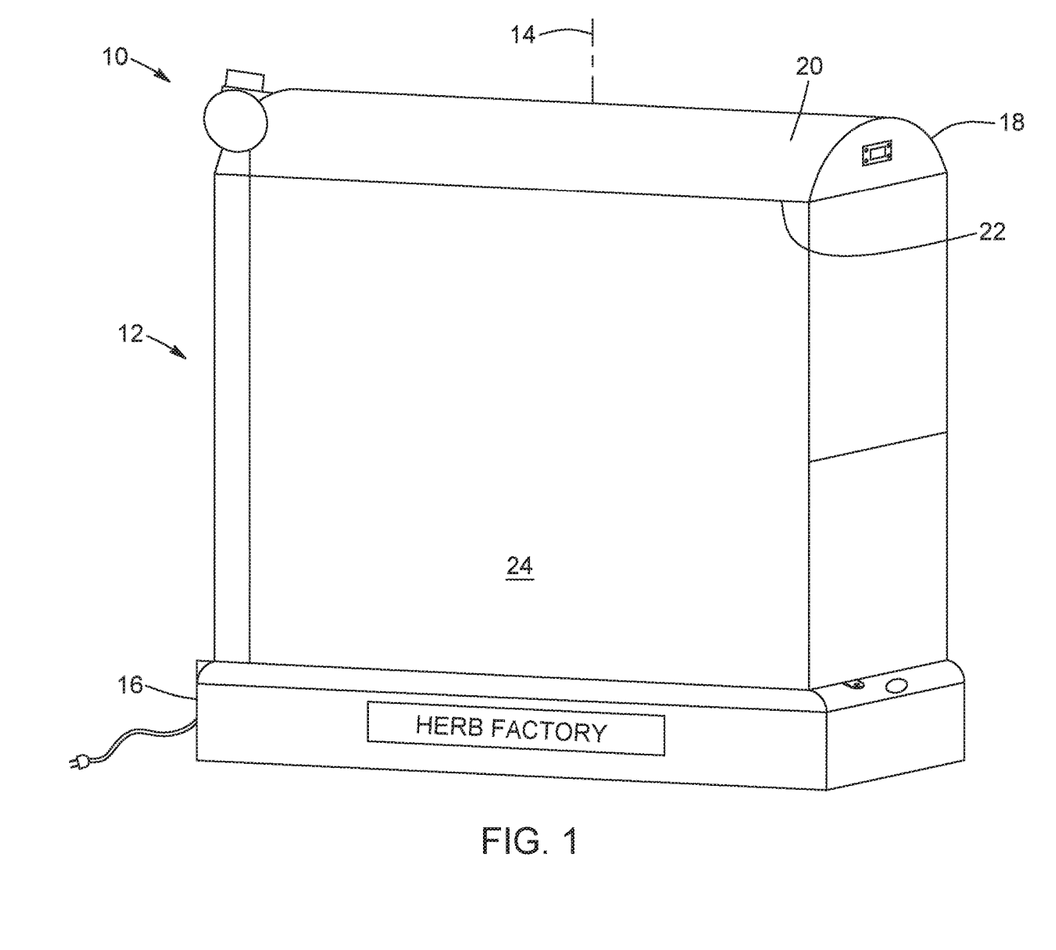
FIG. 1 is a perspective view of a plant growing apparatus according to an embodiment of the present invention.
Figure 4:
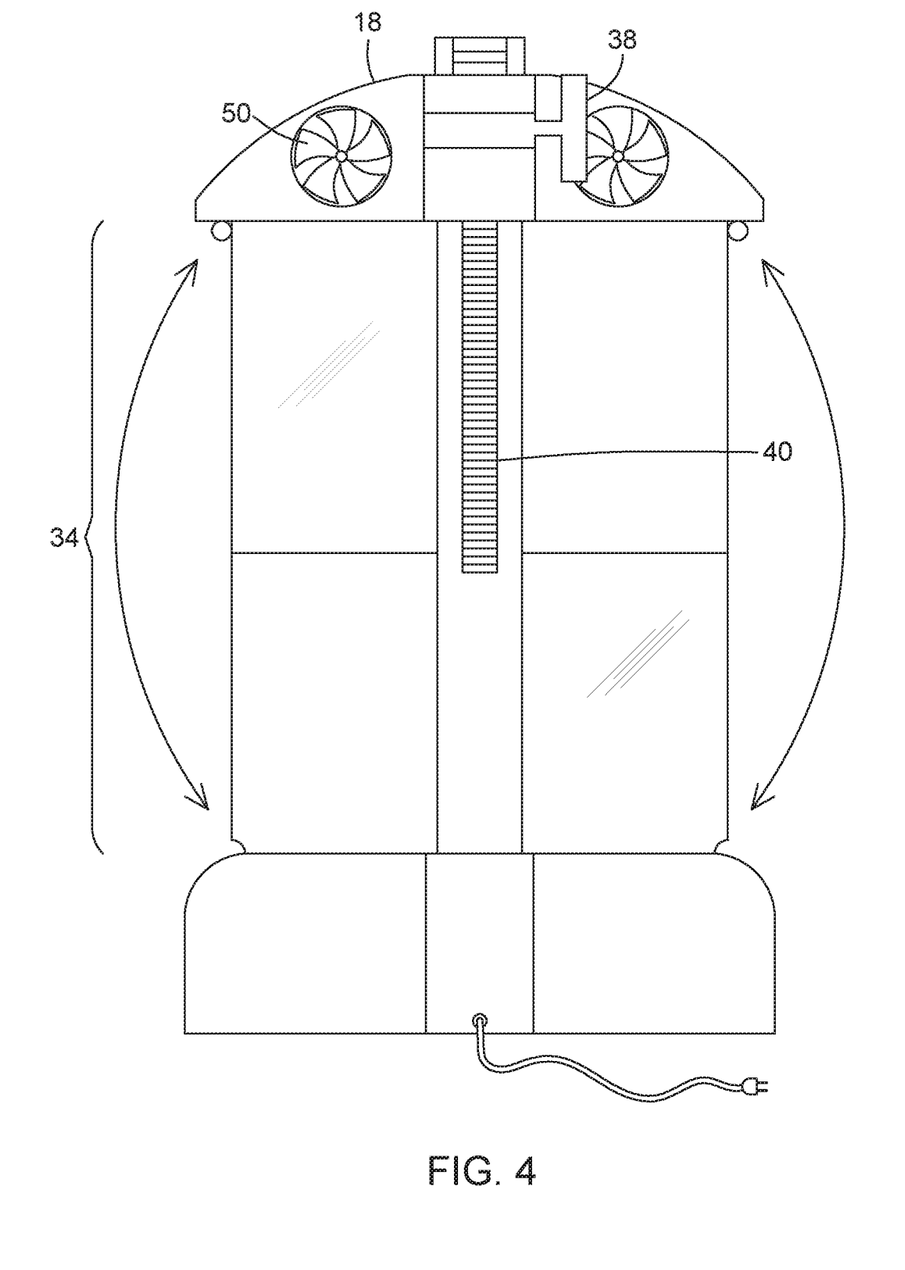
FIG. 4 is a left side view of the plant growing apparatus.

Referring to FIG. 1, there is shown an embodiment of a plant growing apparatus 10. The plant growing apparatus 10 includes a chamber 12 having a vertical axis 14. The chamber generally refers to an at least partially enclosed space. Preferably, the chamber 12 is configured to form a substantially enclosed area for receiving the plants and other components of the plant growing apparatus 10. In some embodiments, the chamber 12 includes a closable air inlet (not shown) for ventilating the chamber 12. With reference to FIG. 4, the plant growing apparatus 10 can further includes at least one fan 50 mounted inside the chamber 12 for ventilation. An inlet of the fan 50 can also be closable to seal the chamber when it is desirable. Preferably, the chamber 12 is substantially opaque, blocking light from surrounding environment to penetrate the chamber 12 and/or blocking light emanating from the chamber 12 to exit the chamber 12.

Figure 2:
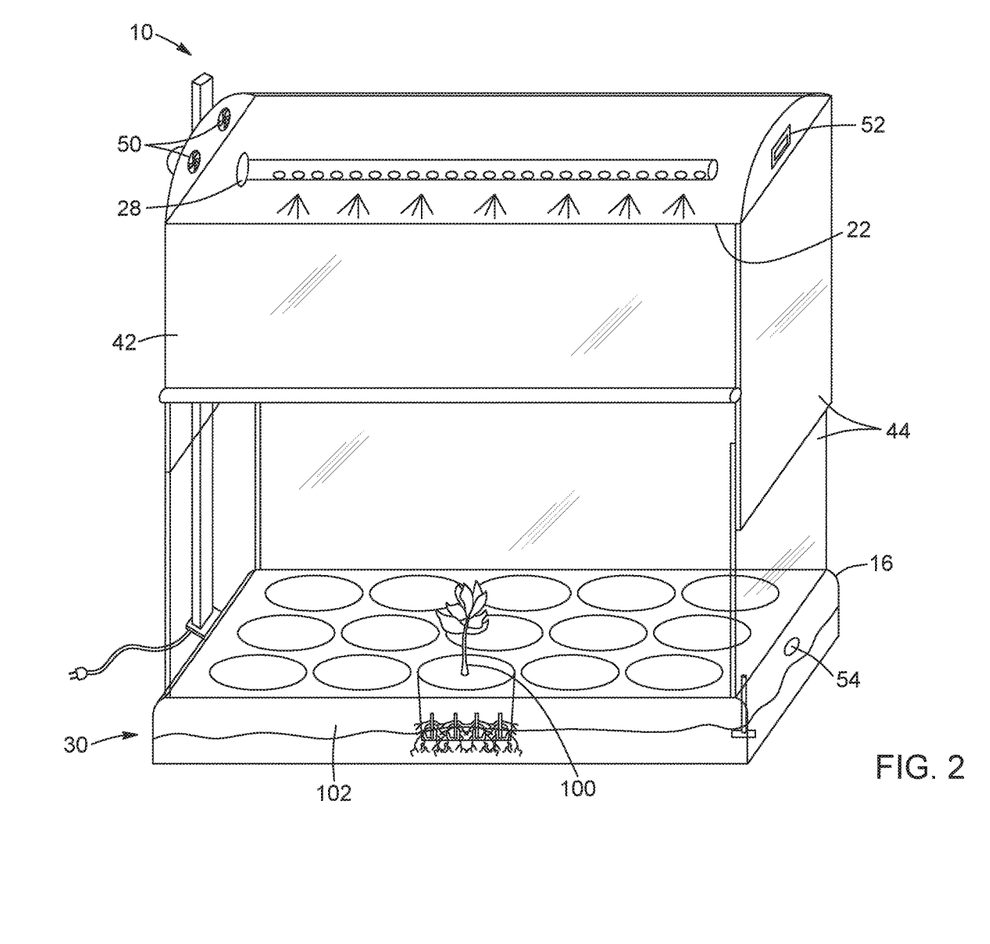
FIG. 2 is a perspective view of what is shown in FIG. 1, with certain components shown as transparent.

As illustrated in FIGS. 1 and 2, the chamber 12 includes a base 16 for receiving the plants 100. With reference to FIG. 2, the base includes a basin 30 adapted to hold water 102 or other liquids therein for the plants 100. The basin 30 can include any component capable of holding and storing water or other liquids. The basin 30 can have different shapes and forms. For example, the basin 30 can be concave, rectangular, or any other shape capable of containing a liquid. The base 16 can also include a closable aperture 54 for supplying water/liquid to the basin 30.

Figure 3:
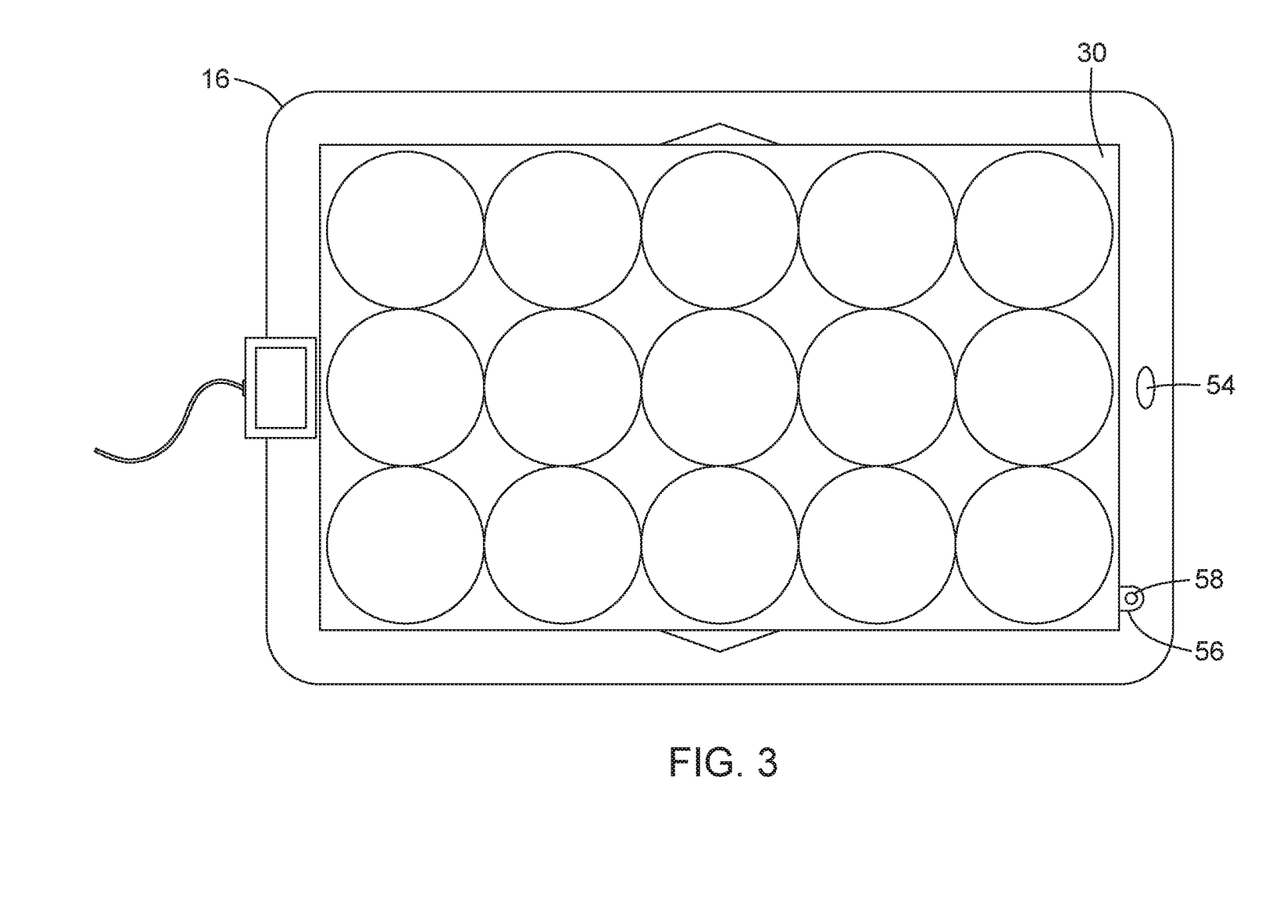
FIG. 3 is a top view of a base of the plant growing apparatus.

In some embodiments as shown in FIG. 3, in order to facilitate monitoring the water level within the basin 30, the base 16 further includes a float inlet 56 and a float stem 58. The float stem 58 is sized and configured to extend upwardly through the float inlet 56 to an upper end above the base 16. In operation, the float stem 58 has a buoyancy such that the float stem 58 floats at the surface of the water within the basin 30. Therefore, the position of the upper end of the float stem 58 continuously indicates the level of water in the basin 30. A user can monitor the position of the float stem 58 to determine the amount of water in the basin 30 without opening the chamber 12.

The chamber 12 also includes a lid 18 movably mounted in relation to the base 16. The lid 18 has an outer face 20 and an opposite inner face 22, such that the inner face 22 of the lid 18 is facing the base 16. The lid 18 can refer to any type of structure capable of covering the chamber 12. Preferably, the lid 18 is substantially opaque.

Figure 5:
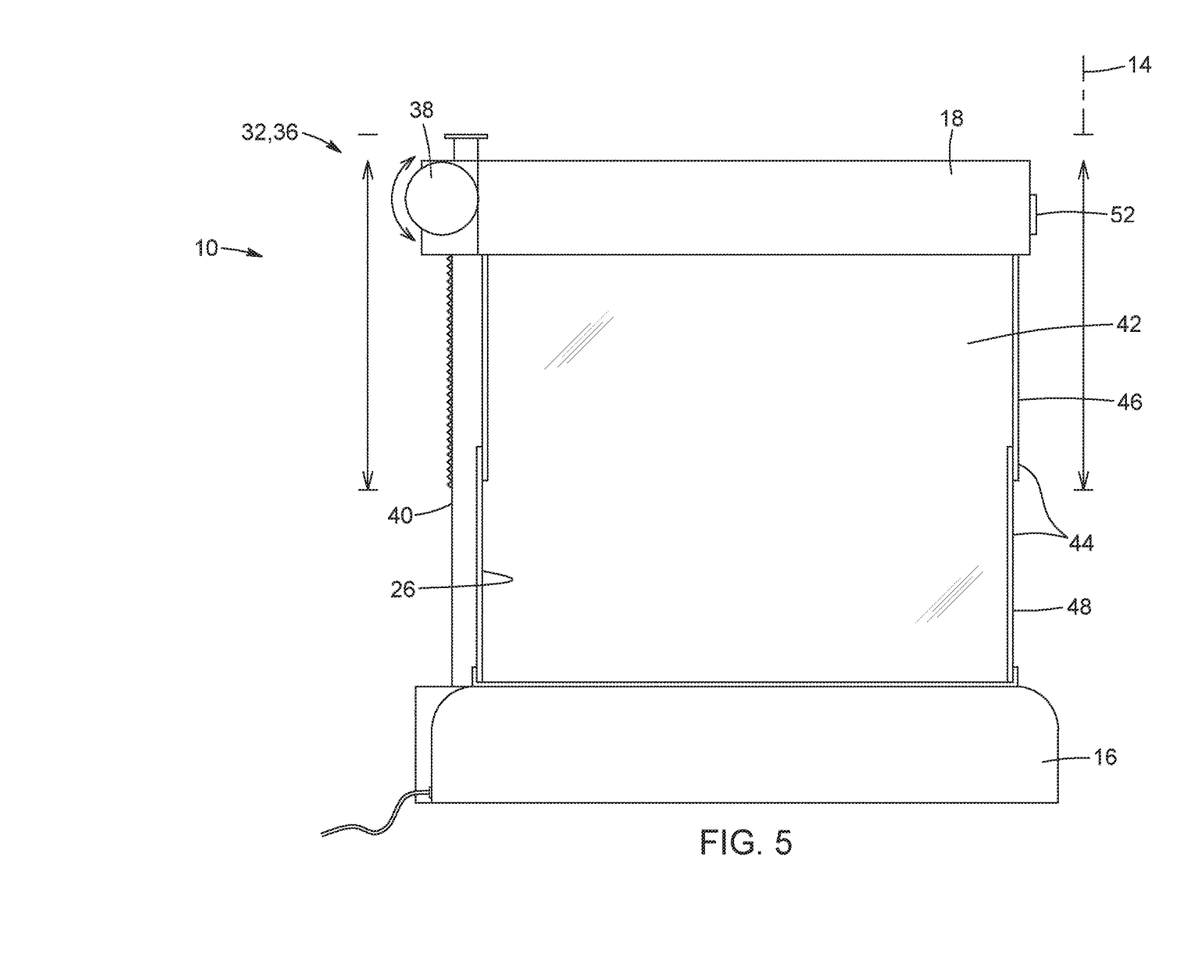
FIG. 5 is a front view of the plant growing apparatus.

With reference to FIGS. 4 and 5, there is shown an embodiment of the plant growing apparatus 10 including a vertical adjustment mount 32. The vertical adjustment mount 32 is operatively connected to the base 16 and to the lid 18 for adjusting a distance 34 between the base 16 and the lid 18. In some embodiments, the lid 18 is slidable along the vertical adjustment mount 32. The vertical adjustment mount 32 can refer to any component for positioning and holding the lid 18 relative to the base 16. The vertical adjustment mount 32 can include an actuator to move the lid 18 in relation to the base 16. The actuator may be a mechanical, electrical or any other suitable device that provides a relative movement between the lid 18 and the base 16. In the illustrated embodiment of FIG. 5, the actuator is a rack and pinion mechanism 36 extending between the base 16 and the lid 18. The pinion 38 is connected to the lid 18 and engaged with the rack 40 to move the lid 18 in relation to the base 16. In operation, activating the actuator or rotating a knob connected to the pinion 38 will cause the pinion 38 to rotate and to move along the rack 40, and therefore displacing the lid 18.

With reference to FIG. 1, the chamber 12 also includes a collapsible screen 24 having an inner surface 26. The collapsible screen 24 is mounted between the base 16 and the lid 18 for closing the chamber 12. The collapsible screen 24 is operable between an extended configuration and a collapsed configuration. The collapsible screen 24 is configured to collapse upon approaching the lid 18 towards the base 16 and to extend, upon distancing the lid 18 away from the base 16. The collapsible screen 24 refers to any side of the chamber 12 capable of closing the chamber 12 between the lid 18 and the base 16. In some embodiments, the collapsible screen 24 comprises at least four collapsible screens 24 wherein each inner surface 26 of a collapsible screen 24 at least partially faces a corresponding inner surface of another collapsible screen. Preferably, the inner surface 26 of the collapsible screen 24 comprises a reflective material for reflecting light within the chamber 12 onto the plants 100 to maximize the efficiency of the plant growing apparatus 10.

In some embodiments as shown in FIG. 2, at least one of the at least four collapsible screens 24 comprises a rollable screen 42. The rollable screen 42 refers to any suitable screen capable of rolling between the extended configuration and the collapsed configuration. The at least four collapsible screens 24 can also include a telescoping panel 44, as shown in FIG. 5. The telescoping panel 44 can include two (or more) rigid partitions, a first rigid partition 46 connected to the lid 18 and a second rigid partition 48 connected to the base 16. The first 46 and second 48 rigid partitions are configured to slide vertically past one another. The use of rollable and/or telescoping screens facilitates the adjustment of the distance 34 between the base 16 and the lid 18. Adjusting the distance 34 with respect to the type of plant 100 used or according to the plant 100 growth cycle allows the plant growing apparatus 10 to remain compact.

As shown in FIG. 2, the plant growing apparatus 10 further includes a horticultural lamp 28 mounted on the inner face 22 of the lid 18. The horticultural lamp 28 can refer to any suitable light emitting source for horticultural plant growth. In some embodiments, the horticultural lamp 28 comprises a LED light source.

Figure 6:
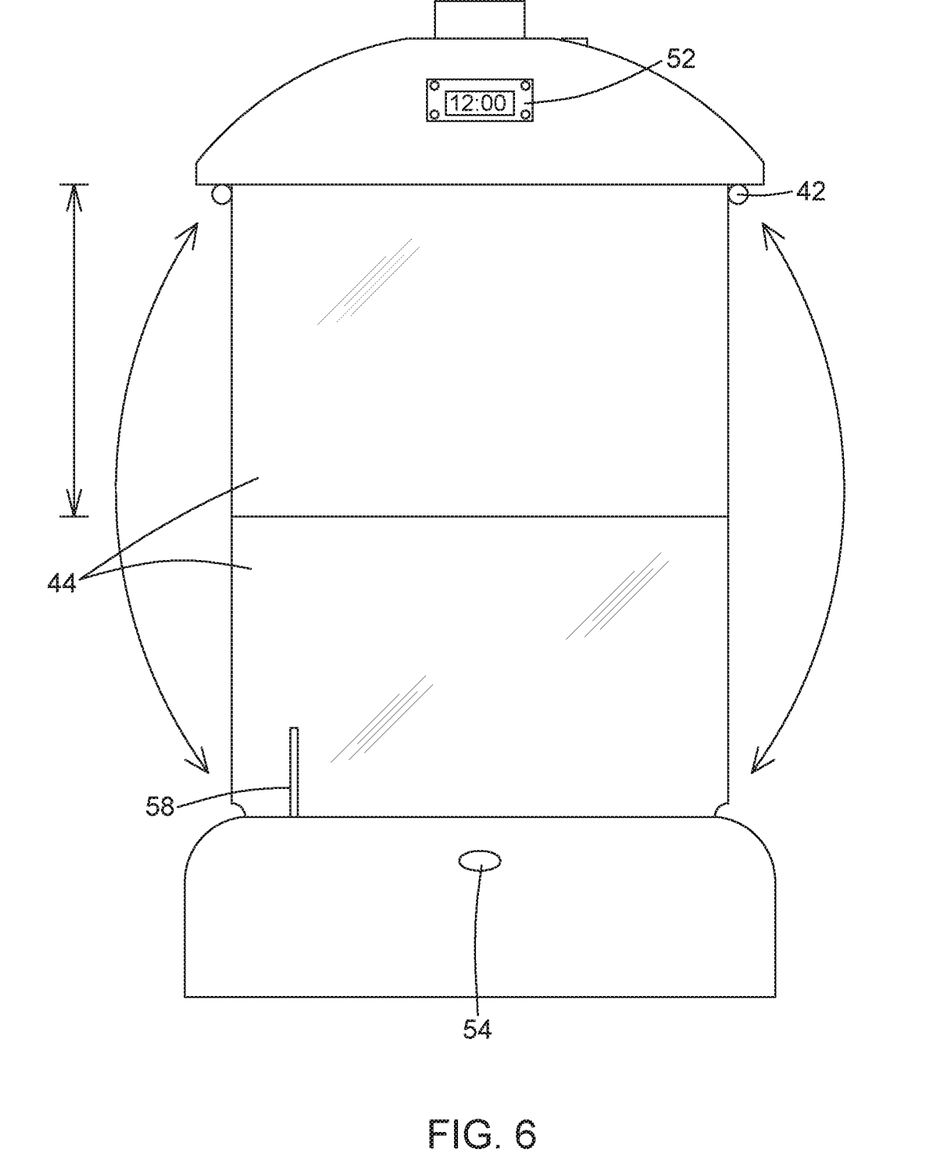
FIG. 6 is a right side view of the plant growing apparatus.

In a preferred embodiment as shown in FIGS. 2 and 6, the plant growing apparatus 10 further includes a timer 52 operatively connected to the horticultural lamp 28 for activating the horticultural lamp 28 during selected time periods. The time periods can depend on the season, the type of plants 100, etc.

In the above description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, although the present invention may be used with various objects, such as plant growing chambers, for example, it is understood that it may be used with other horticulture objects. For this reason, expressions such as "water", "liquid", as well as "plants", "herbs" etc., as used herein should not be taken as to limit the scope of the present invention to these components, in particular. These expressions encompass all other kinds of materials, objects and/or purposes with which the present invention could be used and may be useful, as can be easily understood.

The invention claimed is:

1. A plant growing apparatus, the plant growing apparatus comprising:
   a chamber having a vertical axis, the chamber comprising:

a base for receiving plants, the base comprising a basin adapted to hold water therein;

a lid movably mounted in relation to the base having an outer face and an opposite inner face, such that the inner face of the lid is facing the base; and a collapsible screen having an inner surface and being mounted between the base and the lid for closing the chamber, the collapsible screen being operable between an extended configuration and a collapsed configuration, said collapsible screen being configured to collapse upon approaching the lid towards the base and to extend, upon distancing the lid away from the base; and a horticultural lamp mounted on the inner face of the lid.

2. The plant growing apparatus according to claim 1, comprising a vertical adjustment mount operatively connected to the base and to the lid for adjusting a distance between the base and the lid, wherein the lid is slidable along the vertical adjustment mount.

3. The plant growing apparatus according to claim 2, wherein the vertical adjustment mount comprises an actuator to move the lid in relation to the base.

4. The plant growing apparatus according to claim 3, wherein the actuator is a rack and pinion mechanism extending between the base and the lid, the pinion being connected to the lid and engageable with the rack to move the lid in relation to the base.

5. The plant growing apparatus according to claim 1, wherein the collapsible screen comprises at least four collapsible screens, each inner surface of a collapsible screen at least partially faces a corresponding inner surface of another collapsible screen.

6. The plant growing apparatus according to claim 5, wherein at least one of the at least four collapsible screens comprises a rollable screen.

7. The plant growing apparatus according to claim 5, wherein at least one of the at least four collapsible screens comprises a telescoping panel.

8. The plant growing apparatus according to claim 7, wherein the telescoping panel comprises two rigid partitions, a first rigid partition connected to the base and a second rigid partition connected to the lid, said first and second rigid partitions being configured to slide vertically past one another.

9. The plant growing apparatus according to claim 1, wherein the inner surface of the collapsible screen comprises a reflective material.

10. The plant growing apparatus according to claim 1, wherein the horticultural lamp comprises a LED light source.

11. The plant growing apparatus according to claim 1, further comprising at least one fan mounted inside the chamber.

12. The plant growing apparatus according to claim 1, wherein the chamber comprises a closable air inlet for ventilating said chamber.

13. The plant growing apparatus according to claim 1, further comprising a timer operatively connected to the horticultural lamp for activating said horticultural lamp during selected time periods.

14. The plant growing apparatus according to claim 1, wherein the base comprises a closable aperture for supplying water to the basin.

15. The plant growing apparatus according to claim 1, wherein the base further comprises a float inlet and a float stem extending upwardly through said float inlet to an upper end above the base, the float stem having a buoyancy whereby said float stem floats at the surface of water within the basin, the position of said upper end of said float stem continuously indicating the level of water in said basin.

16. The plant growing apparatus according to claim 1, wherein the chamber is substantially opaque.

* * * * *